(12) United States Patent
Brisebois et al.

(10) Patent No.: US 6,369,803 B2
(45) Date of Patent: *Apr. 9, 2002

(54) ACTIVE EDGE USER INTERFACE

(75) Inventors: Michel A. Brisebois, Wakefield; Laura Mahan, Kanata; Marilyn French-St. George, Alcover; Frederic F. Trasmundi, Ottawa; Jobe L. W. Roberts, Quebec, all of (CA)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,150

(22) Filed: Jun. 12, 1998

(51) Int. Cl.[7] .................................. G09G 5/00
(52) U.S. Cl. ................. 345/173; 345/156; 345/172; 345/178; 178/18.03; 178/18.1; 200/5 R; 200/5 D; 200/8 R; 341/22; 341/29; 341/34
(58) Field of Search ................. 345/156, 172, 345/173, 178; 178/18.05, 18.1, 18.03; 200/5 R, 5 D, 177, 8 R; 341/22, 29, 34

(56) References Cited

U.S. PATENT DOCUMENTS

| | | | | |
|---|---|---|---|---|
| 4,017,848 A | * | 4/1977 | Tannas, Jr. .................. 341/34 |
| 4,085,302 A | * | 4/1978 | Zenk et al. .................. 200/5 A |
| 4,310,839 A | * | 1/1982 | Schwerdt | |
| 4,471,177 A | * | 9/1984 | Doughty ..................... 200/5 A |
| 4,879,548 A | * | 11/1989 | Mitarai et al. .............. 345/174 |
| 5,121,091 A | * | 6/1992 | Fujiyama ........................ 335/1 |
| 5,177,328 A | * | 1/1993 | Ito et al. ........................ 178/18 |
| 5,526,023 A | * | 6/1996 | Sugimoto et al. ........... 345/173 |
| 5,594,471 A | | 1/1997 | Deeran et al. | |
| 5,598,527 A | * | 1/1997 | Debrus et al. .............. 345/173 |
| 5,724,069 A | * | 3/1998 | Chen .......................... 345/172 |
| 5,742,241 A | * | 4/1998 | Crowley et al. .............. 341/22 |
| 5,757,361 A | * | 5/1998 | Hirshik ....................... 345/156 |
| 5,910,802 A | * | 6/1999 | Shields et al. .............. 345/347 |

* cited by examiner

Primary Examiner—Almis R. Jankus
Assistant Examiner—Henry N. Tran
(74) Attorney, Agent, or Firm—Finnegan, Henderson, Farabow, Garrett & Dunner, L.L.P.

(57) ABSTRACT

An active edge user interface includes dynamically configurable flexible touch areas positioned near the perimeter of a display to support interactive communication between a user and a user environment for flexible active touch areas surrounding a display. The interface allows for multiple levels of sensitivity, texture, key travel, and varying widths of active touch areas based on the user environment.

21 Claims, 6 Drawing Sheets

ACTIVE EDGE USER INTERFACE

BACKGROUND OF THE INVENTION

The present invention relates generally to interface devices, and more particularly to a user interface device that includes dynamically configurable flexible touch areas located near the perimeter of a display to support interactive communication between a user and a user environment.

There is always a need for user interface devices that simplify human interaction with computers. Current user interface devices include the keyboard, mouse, and touch-screen systems. Each of these user interface devices offer varying functionality in a desktop environment.

The keyboard allows a user to enter text and symbol information into a computer, and provides predefined keys for executing specific functions (e.g., "save" and "exit" functions). The introduction of the windows-based operating system exposed the limitations of the keyboard, which often required a user to perform multiple keystrokes to execute simple computer functions. To take advantage of the user-friendly, windows-based environment, the mouse was created to provide "point-and-click" functionality. This user interface tool significantly increased the efficiency of a computer session regardless of whether a user performed simple word processing or engaged in complex computer-generated graphic designs. For example, selecting and opening a word processing file typically required three or more keystrokes with a keyboard. However, with a mouse, the user can simply point to the file on the desktop or in a pull down menu and click on the file to open it.

Although preferred in a desktop environment, keyboards and mice are not readily adaptable to smaller computing devices, such as palm-sized computers, wireless communication products, and public kiosks where space is at a premium. For these user environments, touch-screen systems seem to be the preferred choice of users since they do not require physical keys or buttons to enter data into each device. By eliminating physical keys, small computing device manufacturers can significantly reduce the size and weight of the device, characteristics that appeal to consumers. Moreover, through a touch-screen system, a user can interact with a public kiosk using only a display to request and retrieve information. Touch-screen systems typically include a touch-responsive medium that senses a human touch on a particularly area of the display and software to implement a function associated with the touched area.

One example of a touch-screen interface is found in U.S. Pat. No. 5,594,471 to Deeran et al. (the "'471 patent"). The '471 patent discloses an industrial computer workstation with a display and a touch-screen. The touch-screen includes a display touch zone that overlaps the display and a border touch zone located outside the display. Portions of the display touch zone and the border touch zone are programmable as user input areas of the touch-screen and are identified to a user via removable templates. Although convenient, touch-screen systems such as the touch-screen interface of the '471 patent have disadvantages. Removable templates on a touch-screen display can be lost, destroyed, or misplaced, and when using a finger to select an item on a touch-screen, the user's hand can often block a view of the screen. Furthermore, touch-screens quickly become dirty, especially when installed in a public kiosk or an industrial environment, and they do not support key travel—a sliding motion across the screen to execute a function (e.g., scrolling through data) or "two-step" functionality—the ability to implement multiple functions from a single predetermined area of the user interface device.

Therefore, it is desirable to provide an improved user interface device that is robust and ergonomically correct to create a user-friendly environment that does not require physical keys, templates, or touching the actual display.

SUMMARY OF THE INVENTION

Systems and methods consistent with the present invention provide a user interface device that includes dynamically configurable flexible touch areas located near the perimeter of a display to support interactive communication between a user and a user environment.

Specifically, a user interface consistent with this invention comprises a display; an input device located adjacent an edge of the display, and operatively connected to the display to respond to a physical contact; and a processor for executing user interface software configured to implement a function in response to the physical contact on the input device.

A method for implementing a user interface comprises the steps of generating an image on a display in response to at least one of a human touch and a first pressure on a predetermined area of an input device adjacent the display; and implementing a function associated with the image when a second pressure is applied to the predetermined area of the input device.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Systems and methods consistent with the present invention use an active edge user interface positioned near the edge of a display that allows a user to interact with a host device. The active edge user interface includes a flexible input device that extends along at least one edge of a display and responds to touch and pressure to implement one or more functions viewable on the display. This design supports key travel, programmability, ease-of-use, and adaptability to a variety of applications and technologies.

Figure 1:
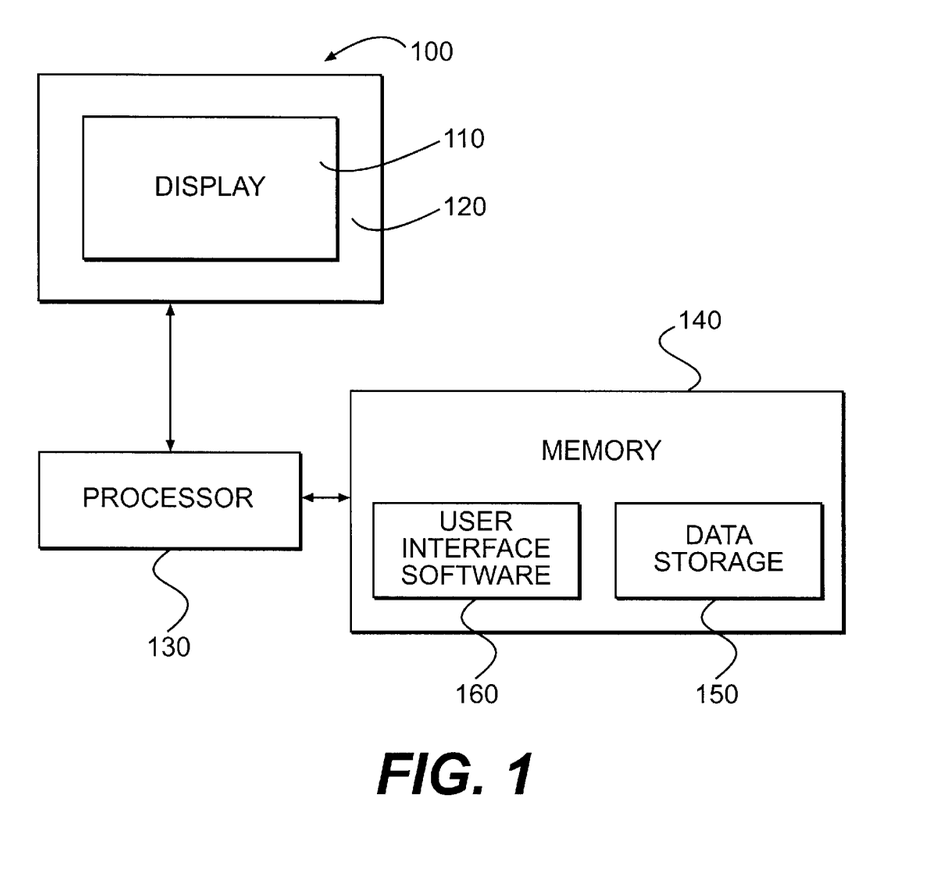
FIG. 1 illustrates an active edge user interface consistent with the present invention.

FIG. 1 illustrates an active edge user interface 100 consistent with the present invention. Active edge user interface 100 includes a display 110, active touch input device 120, processor 130, and memory 140. These components represent the basic infrastructure of active edge user interface 100. One skilled in the art will appreciate that active edge interface 100 may include additional components depending on the host device in which it is used. For example, active edge user interface 100 can be used in a wristwatch, which may require altering the shape and size of display 110 and input device 120. In addition, active edge user interface 100 can be installed in a desktop computer which may include additional processors and memory. Active edge user interface 100 is designed as a universal interface that can operate in any graphical user interface environment.

Display 110 is any commercially available display that is capable of displaying textual and graphical images. Preferably, display 110 is a liquid crystal diode (LCD) display, however, the type of display used with active edge user interface 100 can depend on the user environment. For example, active edge user interface 100 may be used in a desktop computer system. In this instance, images can be generated on display 110 using a cathode ray tube. Alternatively, active edge user interface 100 may be used in a wireless communication device, such as a cellular phone, in which case display 110 is an LCD display. Although illustrated in FIG. 1 with a square screen, display 110 can be any geometrical shape.

Active edge input device 120 is a user interface device positioned adjacent display 110. Active edge input device 120 may actually touch display 110 or lay a predetermined distance away from an edge of display 110. The shape of active edge input device 120 may vary depending on the user environment. For example, active edge input device 120 may be shaped in a manner that visibly distinguishes between a highly used area of the device and a lesser used area of the device (e.g., the highly used area is wider than the lesser used area).

As illustrated in FIG. 1, active edge input device 120 extends around the perimeter of display 110. Nevertheless, active edge input device 120 may be configured to extend only along one, two, or three sides of display 110. If display 110 has a round geometrical shape, active edge input device 120 may form a complete circle around the display or only extend around a portion of the display. The position of active edge input device 120 relative to display 110 is important to provide an ergonomically correct, user-friendly interface device. The structure of and method for using active edge input device 120 with display 110 is described in detail with respect to FIGS. 2–6, respectively.

Processor 130 is preferably a high-speed processor, such as an Intel Pentium® processor, capable of processing simple and complex graphic applications. Processor 130 communicates with display 110 and controls active edge user interface 100. Although illustrated as an external unit, processor 130 can be integrated into display 110 or located in a peripheral device.

Memory 140 is a random access memory (RAM) that communicates with processor 130 to store and retrieve data and software. Preferably, memory 140 facilitates high-speed access to enhance the storage and retrieval process. As illustrated in FIG. 1, memory 140 includes data storage 150 and user interface software 160. One skilled in the art will appreciate that memory 140 can store additional data and software not described herein. For example, in a wireless communications environment, memory 140 may include communications software to support the transfer of voice signals to and from a cell site.

Data storage 150 is an area of memory 140 that stores data. For example, when utilizing active edge input device 120 in a wireless communications device, data storage 150 may include a listing of telephone numbers or call information (e.g., number of calls received within a specified time period). Of course, the type of data resident in data storage 150 may change based on the user environment.

User interface software 160 is a software program resident in memory 140 that implements methods of active edge user interface 100 in accordance with the present invention. User interface software 160 is executed by processor 130 to respond to user inputs into active edge input device 120. User interface software 160 interprets the user inputs and implements an appropriate response. For example, if a user wishes to call a friend, the user selects the friend's name from a telephone listing displayed on the screen by pressing on active edge input device 120 in a predetermined area (e.g., adjacent the friend's name). In response to the selection, user interface software 160 associates the name with a telephone number stored in data storage 150 and instructs processor 130 to dial the number. User interface software 160 can be configured to operate in a variety of user environments such as on a desktop computer or a public kiosk.

Figure 2A:
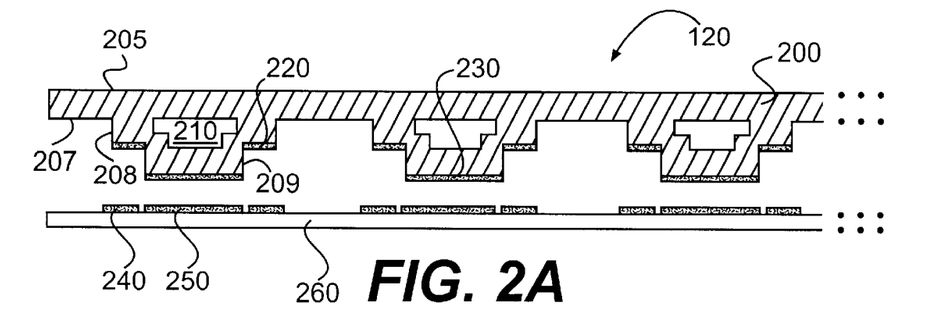
FIG. 2a illustrates a cross-sectional view of a user input device at rest consistent with the present invention.
Figure 2B:
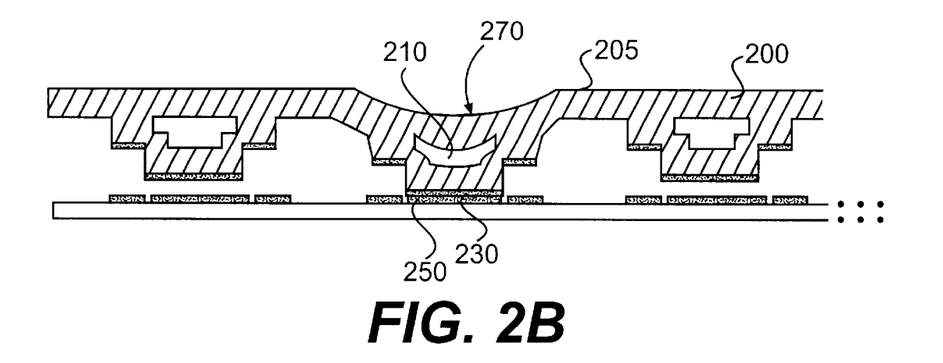
FIG. 2b illustrates a cross-sectional view of the user input device in FIG. 2a with contact applied.
Figure 2C:
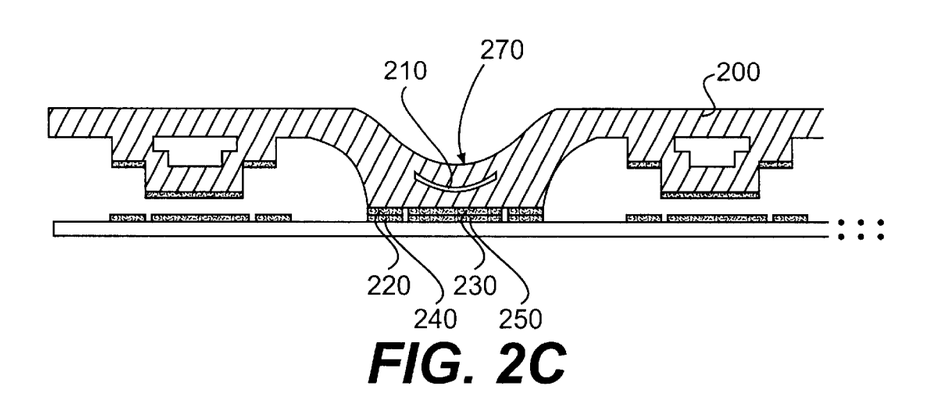
FIG. 2c illustrates a cross-sectional view of the user input device in FIG. 2a with additional contact applied.

FIGS. 2a–2c illustrate cross-sectional views of active edge input device 120 in accordance with a preferred embodiment consistent with the present invention. As illustrated in FIG. 1, active edge input device 120 is a strip of material that extends along a border of display 110 and is responsive to touch or pressure. Active edge input device 120 is designed to provide "two-step" functionality. A first function is implemented at the first step when a first pressure or touch is applied to the input device (e.g., pressure applied by a human finger). A second function is implemented at the second step when a second pressure is applied to the same area on the input device (e.g., additional pressure applied by a human finger in the same location).

FIG. 2a illustrates a cross-sectional view of active edge input device 120 at rest. Active edge input device 120 includes a flexible strip 200 positioned adjacent a host device body surface 260. Body surface 260 is a surface of a host device in which active edge user interface 100 is employed. For example, if the active edge user interface 100 is employed in a wireless communication device, then body surface 260 is a surface of the wireless communication device body.

Flexible strip 200 is an elastomer strip of material that includes an upper surface 205, a lower surface 207 and one or more cavities 210. Although an elastomer material is preferable, flexible strip 200 can be composed of any resilient material. Preferably, flexible strip 200 is a continuous strip of material that extends around at least one side of display 110. However, flexible strip 200 may be sectioned (i.e., non-continuous) as appropriate in the user environment to satisfy design requirements.

Upper surface 205 is a surface of flexible strip 200 that is exposed to a user as illustrated in FIG. 1. Preferably, upper surface 205 is smooth, however, it may include protrusions or have a distinct texture to allow users to locate certain areas on active edge input device 120 by touch alone. The smoothness of upper surface 205 allows a user to drag their finger or other instrument along flexible strip 200 in a sweeping motion. This motion, for example, may be used to implement a scrolling function which allows a user to quickly view information on display 110.

Lower surface 207 includes one or more protrusions 208 that extend outward and include extensions 209. The face of protrusions 208 include upper electrical contacts 220 that are fixed thereon. Preferably, these electrical contacts made from a conductive carbon material and form a continuous ring around extensions 209 as illustrated in FIG. 2a. Upper electrical contacts 220 can be sectioned into distinct units, however, that are spaced around extensions 209. The face of extensions 209 include lower electrical contacts 230 that are fixed thereon. These electrical contacts are "puck-shaped" and are preferably formed from a carbon material.

Body surface 260 includes body protrusion electrical contacts 240 and body extension electrical contacts 250 which are fixed thereon. Preferably, these electrical contacts are also composed of carbon and are aligned with upper electrical contact 220 and lower electrical contacts 230, respectively. A gap exists between the electrical contacts on body surface 260 and the electrical contacts on flexible strip 200 while active edge input device 120 is at rest.

Cavities 210 are formed in an area of flexible strip 200 adjacent each protrusion 208. Preferably, each of cavities 210 is formed in an image of protrusions 208 and extensions 209, but may have any shape. Cavities 210 are designed to collapse when a pressure is applied and return to its original shape when the pressure is released. Thus, cavities 210 provide a "soft button" effect when engaged by a user. The deformation of cavities 210 under pressure is illustrated in FIGS. 2b and 2c.

FIG. 2b illustrates a cross-sectional view of a first pressure applied to active edge input device 120 consistent with a first embodiment of the present invention. This figure shows the first step of the "two-step" functionality described herein. In this instance, a first pressure (e.g., a "touch") is applied to an area 270 of flexible strip 200 which deforms upper surface 205 and cavity 210. The pressure forces protrusion 208 downward until lower electrical contact 230 makes contact with body extension electrical contact 250. The connection of these two electrical contacts generates a signal that is sent to processor 130 for processing. A discussion of how processor 130 responds to this connection is described with respect to FIGS. 4–6. Pressure on one area of flexible strip 200 only affects the components directly below. That is, if pressure is applied to one of three adjacent areas on flexible strip 200, only the selected area will respond to the pressure as shown in FIG. 2b.

FIG. 2c illustrates a cross-sectional view of a second pressure applied to a user input device consistent with a first embodiment of the present invention. This figure shows the second step of the "two-step" functionality described herein. In this instance, the first pressure shown on area 270 is increased to a second pressure (e.g., a "press") until upper electrical contact 220 makes contact with body protrusion electrical contact 240. In this position, both lower electrical contact 230 and upper electrical contact 220 are electrically coupled with the respective body electrical contacts under area 270. This connection generates a second signal to processor 130 which is processed accordingly.

Figure 3A:
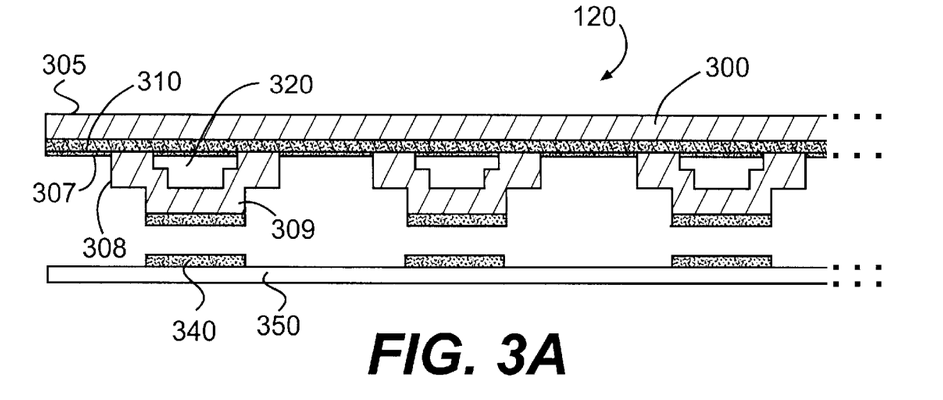
FIG. 3a illustrates a cross-sectional view of another user input device at rest consistent with of the present invention.
Figure 3B:
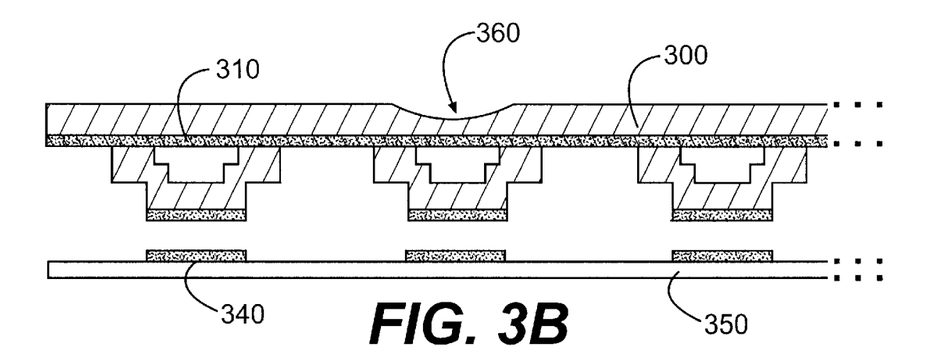
FIG. 3b illustrates a cross-sectional view of the user input device in FIG. 3a with contact applied.
Figure 3C:
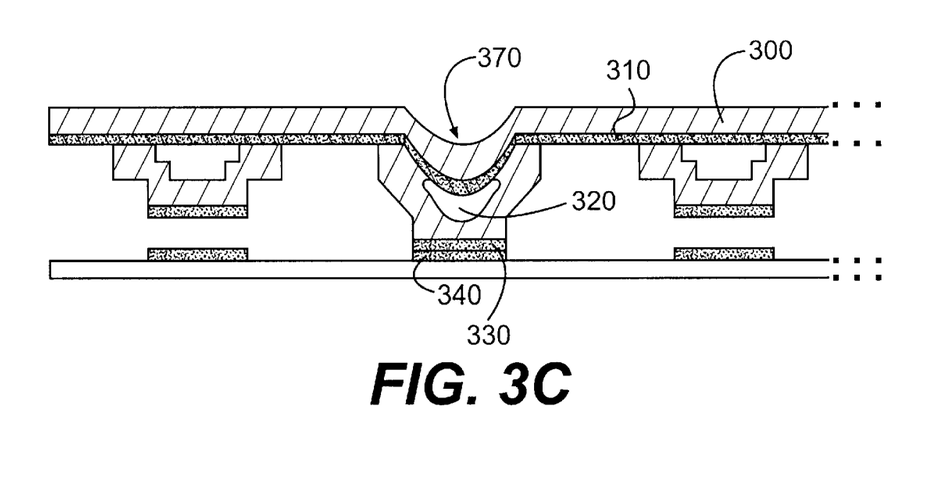
FIG. 3c illustrates a cross-sectional view of the user input device in FIG. 3a with additional contact applied.

FIGS. 3a–3c illustrate a cross-sectional view of a user input device consistent with a second embodiment of the present invention. In this second embodiment, active edge input device 120 includes an alternative design for entering data into a host device. Although the embodiment in FIGS. 2a–2c is preferred, the active edge input device illustrated in FIGS. 3a–3c also provides "two-step" functionality as described herein.

FIG. 3a illustrates a cross-sectional view of a second embodiment of active edge input device 120 at rest. As in the first embodiment, active edge input device 120 includes a flexible strip 300 positioned adjacent a host body surface 350. Body surface 350 is a surface of a host device in which active edge user interface 100 is installed. For example, if active edge user interface 100 is installed in a wireless communication device, then body surface 350 is a surface of the wireless communication device.

Flexible strip 300 is an elastomer strip of material that includes an upper surface 305, a lower surface 307, and one or more cavities 320. Although elastomer is preferable, flexible strip 300 can be composed of any resilient material. Preferably, flexible strip 300 is a continuous strip of material that extends around at least one side of display 110. However, flexible strip 300 may be sectioned (i.e., non-continuous) as appropriate in the user environment to satisfy design requirements.

Upper surface 305 is a surface of flexible strip 300 that is exposed to a user as illustrated in FIG. 1. Preferably, upper surface 305 is smooth, however, it may include protrusions to allow users to locate certain areas on active edge input device 120 by touch alone. The smoothness of upper surface 305 allows users to drag their finger or other instrument along flexible strip 300 in a sweeping motion. This motion, for example, may be used to implement a scrolling function which allows a user to scroll through information on display 110.

Lower surface 307 includes a resistive plate 310 that is responsive to a human touch. Preferably, resistive plate 310 extends along lower surface 307 as a continuous strip of conductive material. However, resistive plate 310 may have separate and distinct sections that are positioned along lower surface 307. Resistive plate 310 may comprise resistive material currently used in conventional touch-screen devices.

Attached to resistive plate 310 are one or more protrusions 308 that extend outward and include extensions 309. The face of extensions 309 include input device electrical contacts 330 fixed thereon, as illustrated in FIG. 3a. These electrical contacts are "puck-shaped" and are formed from an electrically conductive material (e.g., carbon).

Body surface 350 includes body electrical contacts 340 which are fixed thereon. These electrical contacts are also composed of an electrically conductive material (e.g., carbon) and are aligned with input device electrical contacts 330. A gap exists between the electrical contacts on body surface 350 and the electrical contacts on extensions 309 while active edge input device 120 is at rest.

Cavities 320 are formed in an area of flexible strip 300 adjacent each protrusion 308. Preferably, each of cavities 320 are formed in an image of protrusions 308 and extensions 309, as illustrated in FIG. 3a, but may have any shape. Cavities 320 are designed to collapse when a pressure is applied and return to its original shape when the pressure is released. Thus, cavities 320 provide a "soft button" effect when a pressure is applied thereto by a user. The deformation of cavities 320 under pressure is illustrated in FIGS. 3b and 3c.

FIG. 3b illustrates a cross-sectional view of a touch applied to active edge input device 120 consistent with a second embodiment of the present invention. This figure shows the first step of the "two-step" functionality described herein. In this instance, a voltage is applied to resistive plate 310 during operation of the host device. When a human touches upper surface 305 of flexible strip 300 (e.g., on area 360), a change in voltage is detected and a first signal is generated. Processor 130 receives the first signal and responds by implementing user interface software 160. A discussion of how processor 130 implements user interface software 160 is described with respect to FIGS. 4–6. Although FIG. 3b illustrates deformation of flexible strip 300 in the area where a touch is applied, active edge input device 120 can be configured to simply sense a human touch without requiring the application of pressure to flexible strip 300. In this instance, resistive plate 310 simply detects the presence of a human touch on area 360 and does not require any deformation of flexible strip 300.

FIG. 3c illustrates a cross-sectional view of a pressure applied to active edge input device 120 consistent with a second embodiment of the present invention. This figure shows the second step of the "two-step" functionality described herein. In this instance, the first pressure shown in FIG. 3b is increased to a second pressure (e.g., a "press") on area 370 of flexible strip 300 until input device electrical contact 330 makes contact with body electrical contact 340. The second pressure deforms flexible strip 300 including resistive plate 310 and cavity 320. The connection of the electrical contacts generates a second signal to processor 130 which is processed accordingly by implementing user interface software 160.

Figure 4A:
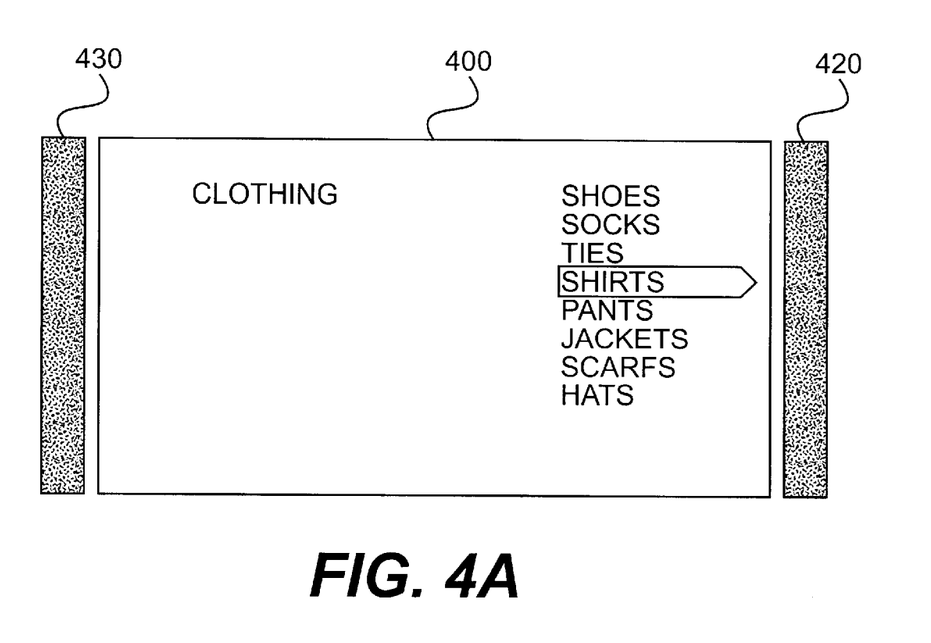
FIG. 4a illustrates the selection of an item illustrated on a display using a user input device consistent with the present invention.
Figure 4B:
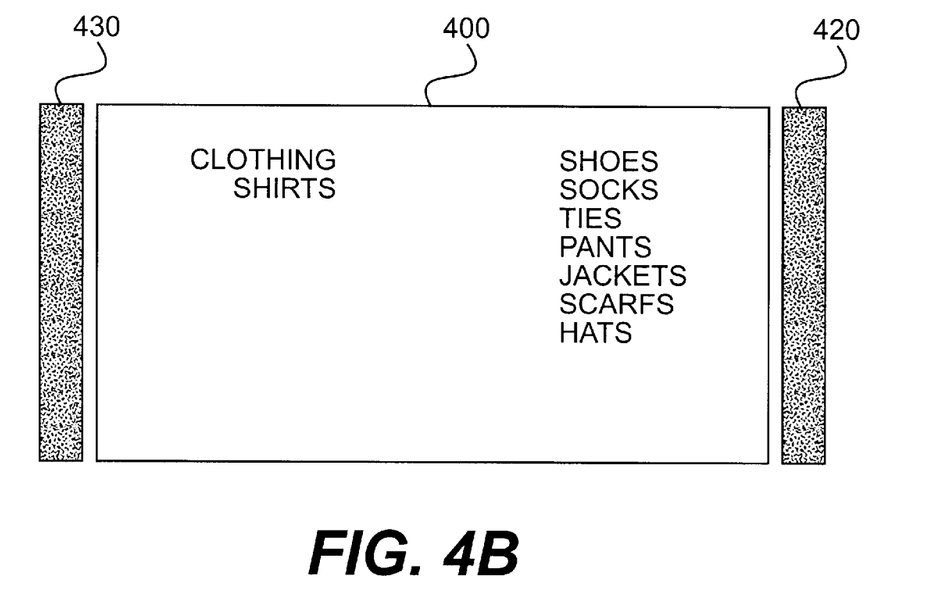
FIG. 4b illustrates a response to the selection of an item illustrated on a display using a user input device consistent with the present invention.

FIGS. 4a–4b illustrate the operation of selecting an item illustrated on a display using an active edge input device consistent with the present invention. Specifically, the operation of display 400, active edge input devices 420 and 430, and user interface software 160 (of FIG. 1) is discussed with reference to FIGS. 4a–4b. Active edge input devices consistent with the present invention are dynamically configurable such that different functions can be associated with each selectable area of the input device depending on the user environment.

FIGS. 4a and 4b illustrate a mode of operation for an active edge user interface consistent with the present invention. The user environment illustrated in these figures includes a notebook computer with an active edge user interface. The notebook computer includes a display 400 and active edge input devices 420 and 430 located on the right and left sides of display 400, respectively. Active edge input devices 420 and 430 may include the design of FIGS. 2a–2c or 3a–3c. In either case, the user can enter information into the notebook computer using active edge input devices 420 and 430.

Initially, information stored in data storage 150 or a peripheral device is generated on display 400. As shown in FIG. 4a, this information relates to fashion and includes a main category "clothing" displayed on the left side of display 400 and a plurality of sub-categories including "shoes, socks, shirts, pants, jackets, scarfs, and hats" displayed on the right side of display 400. In operation, a user can touch or press an area of active edge input device 420 to highlight a sub-category adjacent thereto. In addition, users can drag their finger down or up active edge user input device 420 to scroll through the sub-categories. As illustrated in FIG. 4a, the sub-category "shirts" is highlighted as a result of a touch or press on an adjacent area of active edge input device 420. A sub-category, or any data displayed and selected using embodiments consistent with the present invention, can by highlighted in many different ways. For example, the selected data can change colors, expand, contract, flash, or be affected in any manner that indicates it has been selected by a user via active edge input device 420.

The touch or press on active edge input device 420 corresponding to the selection of the "shirts" sub-category sends a first signal to processor 130 which processes the signal using user interface software 160. User interface software 160 interprets the signal as a selection of the "shirts" category based on the screen location of the currently display data and the selected area on active edge input device 420. Since the touch or press only implements the first step of the "two-step" functionality described herein, the "shirts" category is simply highlighted for the user.

Once the sub-category is highlighted, the user has the option of accepting the selected category or moving to another displayed category. The latter option highlights a newly selected sub-category in a manner similar to the highlighted "shirts" sub-category. If the user chooses to accept the "shirts" sub-category, they simply increase the pressure on active edge input device 420 until the electrical contacts of active edge input device 420 contact the electrical contacts connected to a surface of the host device. This operation implements the second step of "two-step" functionality described herein. At this point, a second signal is sent to processor 130 indicating that the selection is accepted and the "shirts" sub-category moves to the left side of the screen under the "clothing" category, as illustrated in FIG. 4b. User interface software 160 then implements the function associated with the user selection that, in this example, is updating the category listing with "shirts."

The function implemented by user interface software 160 will change depending on the user environment. For example, the display may show an "Announce" function that, when selected, announces predetermined information to specified subscribers over a wireless or wireline communication channel. The "Announce" function may allow the user to select the priority of the announcement by displaying priority selections adjacent an active edge input device (e.g., gold priority for urgent, silver priority for semi-urgent, and bronze for not urgent). Using the active edge input device, the user can scroll through the displayed priority categories and select the desired priority using the "two-step" functionality described herein. Another example of this feature is discussed with reference to FIGS. 5a–5d.

Figure 5A:
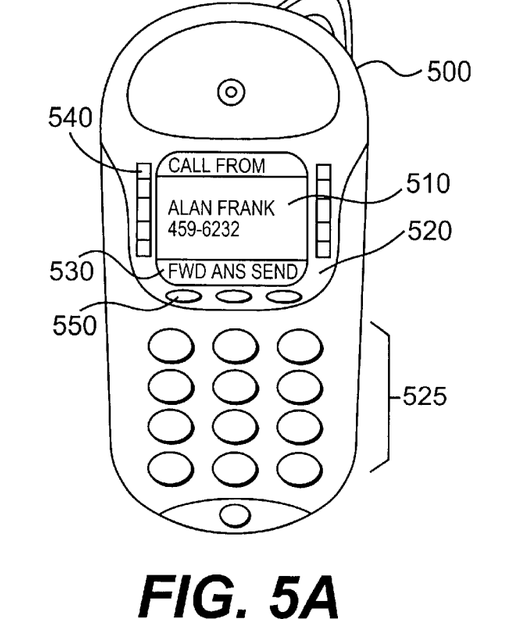
FIG. 5a illustrates an implementation of an active edge user interface on a wireless communications device for responding to a call consistent with the present invention.

FIG. 5a illustrates an implementation of an active edge user interface on a wireless communications device 500 for responding to a call consistent with the present invention. Wireless communication device 500 is a host device that includes a display 510, an active edge input device 520, and a keypad 525. The upper highlighted portion of display 5 10 indicates the currently displayed function (e.g., "call from" or "contact"). The middle portion of display 510 shows data entered by a user or received from a remote device. The lower portion of display 510 shows function parameters, such as "Fwd," "Ans," and "Send." Active edge input device 520 is a continuous strip of flexible material that borders three sides of display 510. Active edge input device 520 includes protrusions in the shape of ribs 540 on the left and right sides of display 510, and buttons 550 on the bottom side of the display. One or more buttons 550 correspond to one or more of the displayed function parameters.

Figure 5B:
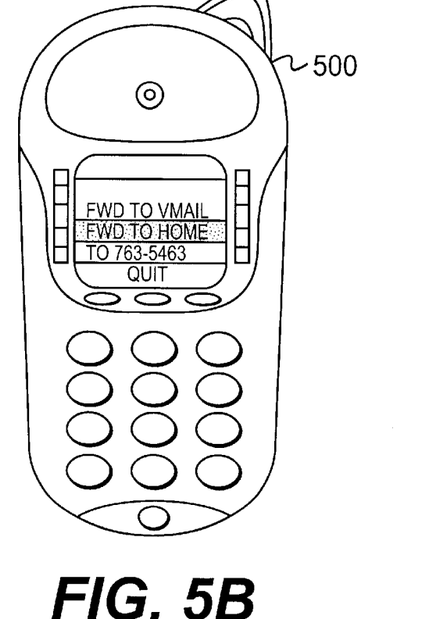
FIG. 5b illustrates an implementation of an active edge user interface on the wireless communications device of FIG. 5a for forwarding a call.

Display 510 in FIG. 5*a* indicates to the user that wireless communications device 500 is receiving or has received a call from "Alan Frank" whose telephone number is "459-6232." The user has the option of answering or forwarding the call by pressing the appropriate button 550. If the "Ans" function parameter is selected, wireless communications device 500 connects the call. If the "Fwd" function parameter is selected, the user has the option of forwarding the call to "VMail" (i.e., voicemail) or to "Home" (i.e., to telephone number "763-5463") as illustrated in FIG. 5*b*. The user can move between each displayed option, for example, by dragging a finger along the left or right side surface of active edge input device 520. One skilled in the art will appreciate that active edge user interface may be configured such that the user can only use one side of active edge input device to select between the options on display 510.

When the user is touching or slightly pressing on an area of active edge input device 520 adjacent a desired option, the option is highlighted, as shown in FIG. 5*b*. The touching or slight pressure represents the first step of the "two-step" functionality implemented by embodiments consistent with the present invention. To accept the highlighted option, the user presses harder on active edge input device 520, which forwards Alan Frank's call to the user's home. This secondary pressure represents the second step of the "two-step" functionality. The user may choose to quit the current display at any time by touching on active edge input device 520 below the displayed "Quit" function parameter.

Figure 5C:
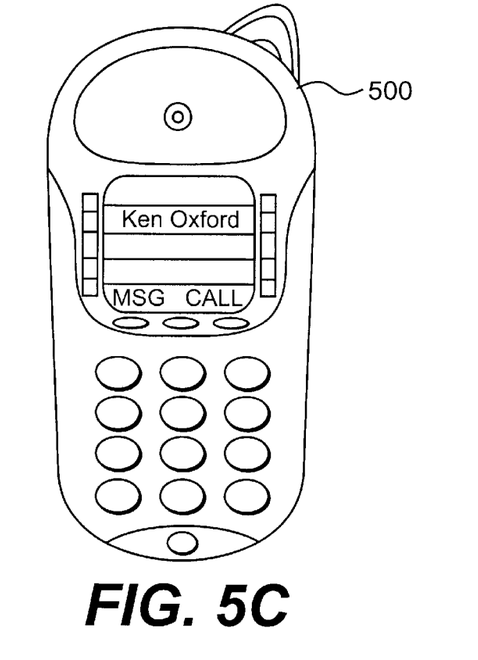
FIG. 5c illustrates an implementation of an active edge user interface on the wireless communications device of FIG. 5a for locating information in memory.

The user may choose to make a call from wireless communications device 500. In this instance, the user presses on active edge input device 520 below the "Call" function as illustrated in FIG. 5*c*. Upon selecting this function, a list of names stored in memory appears on display 510. If the list is voluminous, the user can scroll through the list by dragging (e.g., touching or slightly pressing) a finger or other instrument in an upward or downward motion across the surface of active edge input device 520. In the scrolling mode, display 510 may automatically switch to an iconic view to show where the user is on the list, as shown in FIG. 5*c*.

Figure 5D:
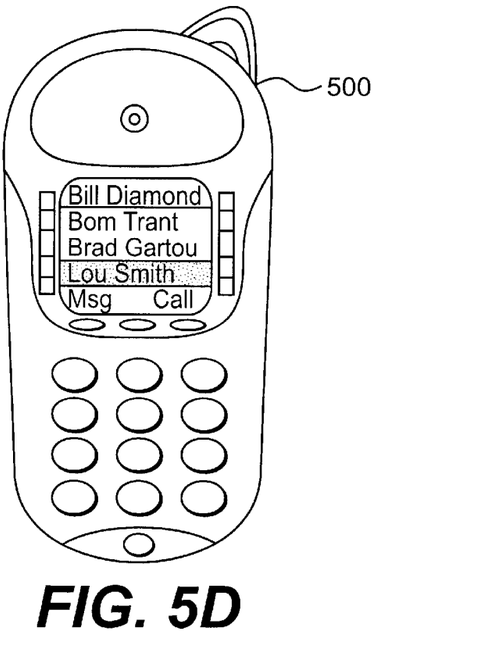
FIG. 5d illustrates an implementation of an active edge user interface on the wireless communications device of FIG. 5a for selecting the name of a person.

Upon reaching a desired name on the list, the name is highlighted by the touch or slight pressure on active edge input device 520 adjacent the name, as illustrated in FIG. 5*d*. The user can then initiate the call by pressing harder on active edge input device 520. Alternatively, the user could only send a message to a specified person by selecting the appropriate function key on the bottom of display 510.

Figure 6:
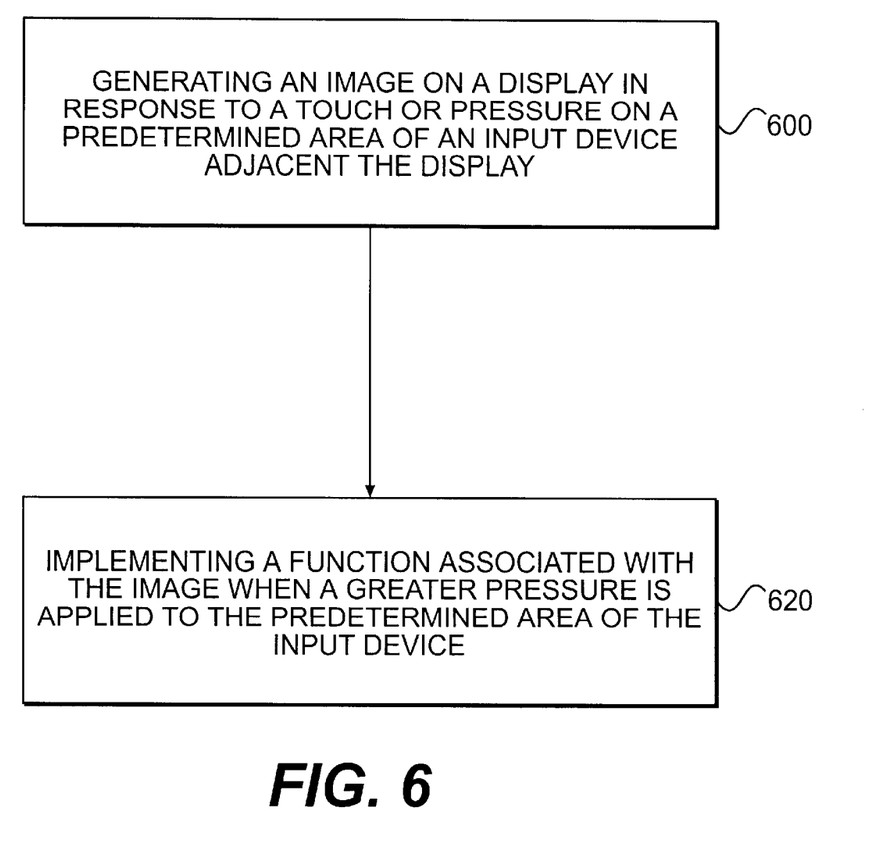
FIG. 6 illustrates a flowchart of a method for implementing an active edge user interface consistent with the present invention.

FIG. 6 illustrates a method for implementing an active edge user interface consistent with the present invention. Initially, an active edge user interface generates an image on a display in response to a touch or pressure on a predetermined area of an input device adjacent the display (step 600). Subsequently, active edge user interface implements a function associated with the image when a greater pressure is applied to the predetermined area of the input device (step 620). The function, for example, could be calling a highlighted name (i.e., represented by the image) on a wireless communications device.

Systems and methods consistent with the present invention thus provide an active edge user interface that offers great functionality and ease-of-use. Moreover, an active edge user interface consistent with the present invention eliminates the need to touch the actual display while preserving the benefits of a graphical user interface.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A user interface, comprising:
    a display;
    an input device located adjacent an edge of the display, and operatively connected to the display to respond to a physical contact having a plurality of electrical contacts positioned to electrically couple in response to the physical contact, wherein each electrical contact includes a first set of mating contacts positioned a first distance from one another and a second set of mating electrical contacts positioned a second distance from one another; and
    a processor for executing user interface software configured to implement a function in response to the physical contact on the input device.

2. The user interface of claim 1 wherein the display is a liquid crystal diode display.

3. The user interface of claim 1 wherein the input device includes a flexible elastomer strip having an upper surface and a lower surface.

4. The user interface of claim 3 wherein the elastomer strip includes a deformable cavity formed therein.

5. The user interface of claim 3 wherein the upper surface of the elastomer strip is smooth.

6. The user interface of claim 3 wherein the upper surface of the elastomer strip includes a protrusion.

7. The user interface of claim 1 wherein the input device includes a resistive plate positioned to generate a response to the physical contact.

8. The user interface of claim 1 wherein at least one of the first set of mating electrical contacts is ring-shaped.

9. The user interface of claim 1 wherein at least one of the second set of mating electrical contacts is disc-shaped.

10. The user interface device of claim 1 wherein the user input device is permanently affixed to a host device.

11. The user interface device of claim 1 wherein the user input device extends along more than one edge of the display.

12. A method for implementing a user interface, comprising the steps of:
    highlighting an image on a display in response to a first contact applied with a first pressure at a location on an input device adjacent an edge of the display; and
    implementing a function associated with the image when a second contact is applied with a second pressure at the location, wherein the second pressure is different from the first pressure.

13. The method of claim 12 wherein the highlighting step includes the step of generating textual data on the display.

14. The method of claim 13 further comprising the step of scrolling through the textual data generated on the display in response to a sliding contact.

15. The method of claim 12 wherein the highlighting step includes the step of generating graphical data on the display.

16. The method of claim 15 further comprising the step of scrolling through the graphical data generated on the display in response to a sliding contact.

17. The method of claim 12 wherein the highlighting step includes the step of generating an image corresponding to a programmable area of the user input device.

18. The method of claim 12 wherein the highlighting step includes the step of generating an image that identifies a category of information corresponding to a first predetermined area of the input device and generating an image that identifies a subcategory of information corresponding to a second predetermined area of the input device.

19. A user interface, comprising:

a display;

an input device comprising a flexible strip having a plurality of touch areas each associated with contacts and extending along at least one edge of the display, the input device being operatively connected to the display to respond to a physical contact on the touch areas; and a processor for executing a user interface software configured to implement a function in response to the physical contact on the input device, wherein the contacts comprise first and second mating contacts and the function comprises a first function and a second function, the contacts being responsive to a physical contact with a first pressure to close the first mating contacts and cause implementation of the first function and the contacts being responsive to physical contact with a second pressure to close the second mating contacts and cause implementation of the second function.

20. A user interface according claim 19, wherein the contacts are responsive to sliding pressure along successive touch areas of the flexible strip to cause a scroll function.

21. A user interface, comprising:

a display;

an input device comprising a flexible strip having a plurality of touch areas each associated with contacts and extending along at least one edge of the display, the input device being operatively connected to the display to respond to a physical contact on the touch areas; and a processor for executing a user interface software configured to implement a function in response to the physical contact on the input device, wherein the contacts comprise first and second mating contacts and the function comprises a select function and a second function, a selected contact being responsive to a physical contact with a first pressure to close the first mating contacts and cause implementation of the select function, and the selected contact and immediately adjacent contacts then being responsive to a physical contact with a second pressure to close the second mating contacts and cause implementation of the second function.

* * * * *